US011720369B2

(12) United States Patent
Kanjirathinkal et al.

(10) Patent No.: US 11,720,369 B2
(45) Date of Patent: Aug. 8, 2023

(54) PATH MANAGEMENT AND FAILURE PREDICTION USING TARGET PORT POWER LEVELS

(71) Applicant: EMC IP Holding Company LLC, Hopkinton, MA (US)

(72) Inventors: Joseph G. Kanjirathinkal, Cary, NC (US); Peniel Charles, Bangalore (IN); Owen Crowley, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 200 days.

(21) Appl. No.: 17/069,341

(22) Filed: Oct. 13, 2020

(65) Prior Publication Data

US 2022/0113985 A1 Apr. 14, 2022

(51) Int. Cl.
*G06F 9/4401* (2018.01)
*G06F 1/20* (2006.01)
*G06F 1/18* (2006.01)

(52) U.S. Cl.
CPC ............ *G06F 9/4411* (2013.01); *G06F 1/183* (2013.01); *G06F 1/206* (2013.01)

(58) Field of Classification Search
CPC ......... G06F 9/4411; G06F 1/183; G06F 1/206
See application file for complete search history.

(56) References Cited

U.S. PATENT DOCUMENTS

| | | | | |
|---|---|---|---|---|
| 9,110,972 B2* | 8/2015 | Hamdi | ............... | H04L 12/40045 |
| 9,176,550 B2* | 11/2015 | Sur | ......................... | G06F 1/324 |
| 9,801,132 B2* | 10/2017 | Ivanov | .................. | H04W 28/22 |
| 2012/0254482 A1* | 10/2012 | Kabakura | ............ | G06F 3/0614 |
| | | | | 710/38 |
| 2015/0169249 A1* | 6/2015 | Kalman | .................. | H04L 45/24 |
| | | | | 710/38 |

OTHER PUBLICATIONS

Astigarraga et al., "Sick But Not Dead Failures, Adaptive Testing, Evaluation and Design Methodologies", International Journal on Advances in Systems and Measurements, vol. 6, No. 3 and 4 (2013).

* cited by examiner

*Primary Examiner* — Tammara R Peyton
(74) *Attorney, Agent, or Firm* — Ryan, Mason & Lewis, LLP

(57) ABSTRACT

Techniques are provided for path management and failure prediction in a multipath environment using target port power levels. One method comprises obtaining, by a first entity that communicates with a second entity via multiple paths, a transmit power level and/or a receive power level of a target port associated with the second entity; evaluating the transmit power level and/or the receive power level of the target port relative to a threshold; and setting, by the first entity, a path state of one or more paths between the first entity and the target port to a standby state based on the evaluating, wherein the first entity establishes paths between the first entity and one or more other target ports of the second entity in an active state. Existing communications on the one or more paths between the first entity and the target port may be allowed to complete in the standby state.

20 Claims, 7 Drawing Sheets

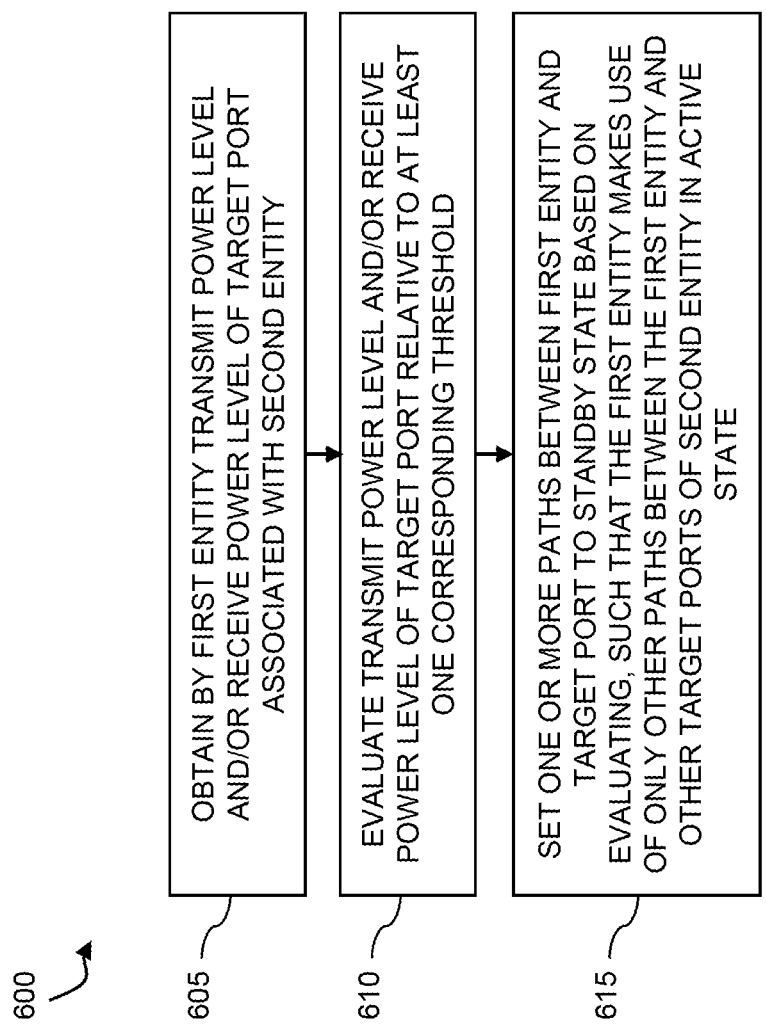

1. STORAGE ARRAY 105 MONITORS RECEIVE AND/OR TRANSMIT POWER VALUES OF SFP OF TARGET PORTS 202.

2. WHEN RECEIVE AND/OR TRANSMIT POWER VALUES OF SFP OF A GIVEN TARGET PORT 202 FALL BELOW A WARNING OR ALARM THRESHOLD, STORAGE ARRAY 105 UPDATES VALUES IN A VENDOR-SPECIFIC SCSI PAGE.

3. MPIO DRIVER 112 INSTALLED ON A GIVEN HOST 102 MONITORS HEALTH OF SFPs.

4. WHEN OBTAINED RECEIVE AND/OR TRANSMIT POWER VALUES OF SFP OF A GIVEN TARGET PORT 202 FALL BELOW A WARNING OR ALARM THRESHOLD, MPIO DRIVER 112 PERFORMS THE FOLLOWING STEPS:

A. PLACE PATHS TO AFFECTED TARGET SFPs IN A STANDBY MODE;

B. AVAILABLE AND UNAFFECTED PATHS ARE USED FOR IO ACTIVITY; AND

C. LOG MESSAGE IN HOST DEVICE 102 SO END USERS ARE AWARE OF FAULT SITUATION AND TYPE OF FAULT THAT CAN CAUSE A PATH FAILURE.

5. MPIO DRIVER 112 PERIODICALLY CHECKS IF RECEIVE AND/OR TRANSMIT POWER VALUES OF SFPs OF TARGET PORTS 202 IN STANDBY MODE ARE RESTORED BACK TO A NORMAL RANGE; ONCE RECEIVE AND/OR TRANSMIT POWER VALUES OF SFPs OF TARGET PORTS 202 ARE BACK TO A NORMAL RANGE, MPIO DRIVER 112 CHANGES PATH STATE IN STANDBY MODE TO AN ACTIVE MODE AND IOs CAN AGAIN BE DISPATCHED.

FIG. 7

PATH MANAGEMENT AND FAILURE PREDICTION USING TARGET PORT POWER LEVELS

FIELD

The field relates generally to information processing systems, and more particularly to communication techniques for such information processing systems.

BACKGROUND

Host devices typically communicate with a storage system over a network via a number of different paths. A given host device may comprise a multipath input-output (MPIO) driver, for example, that is configured to process input-output (IO) operations for delivery from the host device to the storage system over one or more paths. Multipath devices are utilized by the MPIO drivers of a host device to distribute IO operations across available paths to a given logical volume. When a failure or a timeout occurs for a given path, the MPIO driver will typically redirect the IO operations to other active paths in the multipath device, thereby incurring a penalty.

A need exists for improved techniques for managing the paths in a multipath environment and for predicting path failures.

SUMMARY

In one embodiment, a method comprises obtaining, by a first entity that communicates over a network with at least one second entity via a plurality of paths, an indication of one or more of a transmit power level and a receive power level of at least one target port associated with the second entity; evaluating the one or more of the transmit power level and the receive power level of the at least one target port relative to at least one corresponding threshold; and setting, by the first entity, a path state of one or more paths between the first entity and the at least one target port to a standby state based at least in part on the evaluating, wherein the first entity establishes paths between the first entity and one or more other target ports of the second entity in an active state. One or more existing communications on the one or more paths between the first entity and the at least one target port may be allowed to complete in the standby state. The target port may be embodied, for example, using a small form-factor pluggable port.

Other illustrative embodiments include, without limitation, apparatus, systems, methods and computer program products comprising processor-readable storage media.

BRIEF DESCRIPTION OF THE DRAWINGS

FIG. 6 is a flow diagram of an example process for path management and failure prediction using target port power levels in some embodiments; and FIG. 7 illustrates exemplary pseudo code for a path management and failure prediction process using target port power levels, according to one embodiment of the disclosure.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
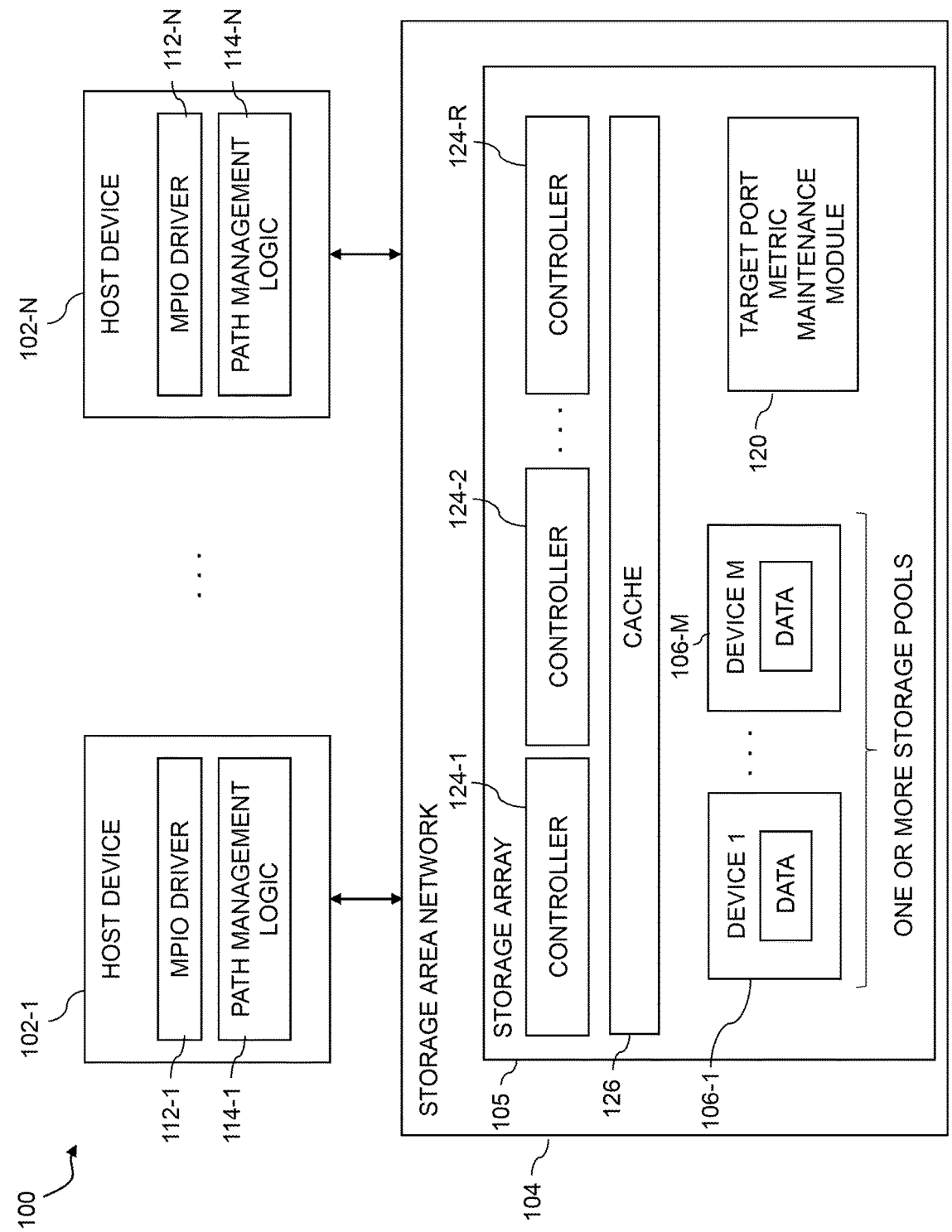
FIG. 1 is a block diagram of an information processing system configured with functionality for path management and failure prediction using target port power levels in an illustrative embodiment.

FIG. 1 shows an information processing system 100 configured for path management and failure prediction using target port power levels in accordance with an illustrative embodiment. The information processing system 100 comprises a plurality of host devices 102-1 through 102-N. The host devices 102 communicate over a storage area network (SAN) 104 with at least one storage array 105. The storage array 105 comprises a plurality of storage devices 106-1 through 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102 and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS)

model, although it is to be appreciated that numerous other cloud infrastructure arrangements could be used.

The storage devices 106 of the storage array 105 of SAN 104 implement logical volumes such as, e.g., logical units (LUNs), that are configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise Small Computer System Interface (SCSI) commands, Internet SCSI (iSCSI) commands, Fibre Channel Protocol (FCP) commands, or non-volatile memory express (NVMe) commands, although other types of commands can be used in other embodiments. A given IO operation, as that term is broadly used herein, illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths. In illustrative embodiments, with reference also to the example of FIG. 2, each of the host devices 102 comprises one or more hardware bus adapter (HBA) ports 200, e.g., HBA ports 200-1 and 200-2 in the example of FIG. 2, which are utilized to communicate with the storage array 105 via the SAN 104. In some embodiments, the HBA ports 200 are referred to as initiators for the IO paths. For example, the HBA port 200-1 of host device 102-1 may be referred to as initiator 1 (I1) and the HBA port 200-2 of host device 102-1 may be referred to as initiator 2 (I2). HBA ports 200 may comprise any circuitry that is configured to enable communication between the host devices 102 and the storage array 105 or any other devices.

In some embodiments of a SAN 104, each host device 102 is made visible to LUNs via multiple array target ports, and hence LUNs can be accessed via multiple paths. During a failure in a target port, multipathing software retries the failed IO via alternate paths and ensures that the IO succeeds. Whenever a path failure happens, however, the IO retry on other active paths incur a penalty.

In one or more embodiments, the storage array 105 further comprises a target port metric maintenance module 120 to maintain and/or report current values, for example, of temperature, current, voltage, receive power and transmit power of target ports, as discussed further below in conjunction with FIGS. 2 and 5.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

Storage array 105 also comprises a plurality of controllers 124-1, 124-2, . . . 124-R and a cache 126. In some embodiments, storage array 105 may comprise one controller 124, two controllers 124 or any other number of controllers 124. In illustrative embodiments, controllers 124 comprise processing devices, memory, or other circuitry that may be used to service input-output operations that are received from the host devices 102. While controllers 124 may be described as comprising particular configurations herein, controllers 124 are not limited to the disclosed embodiments and may comprise any other configuration of electrical and software components that may be utilized to service input-output operations that are received from host devices 102 by storage array 105. With reference also to the example of FIG. 2, in some embodiments, each of the controllers 124 comprises one or more ports 202, which are utilized to communicate with the host devices 102 via the SAN 104.

Figure 2:
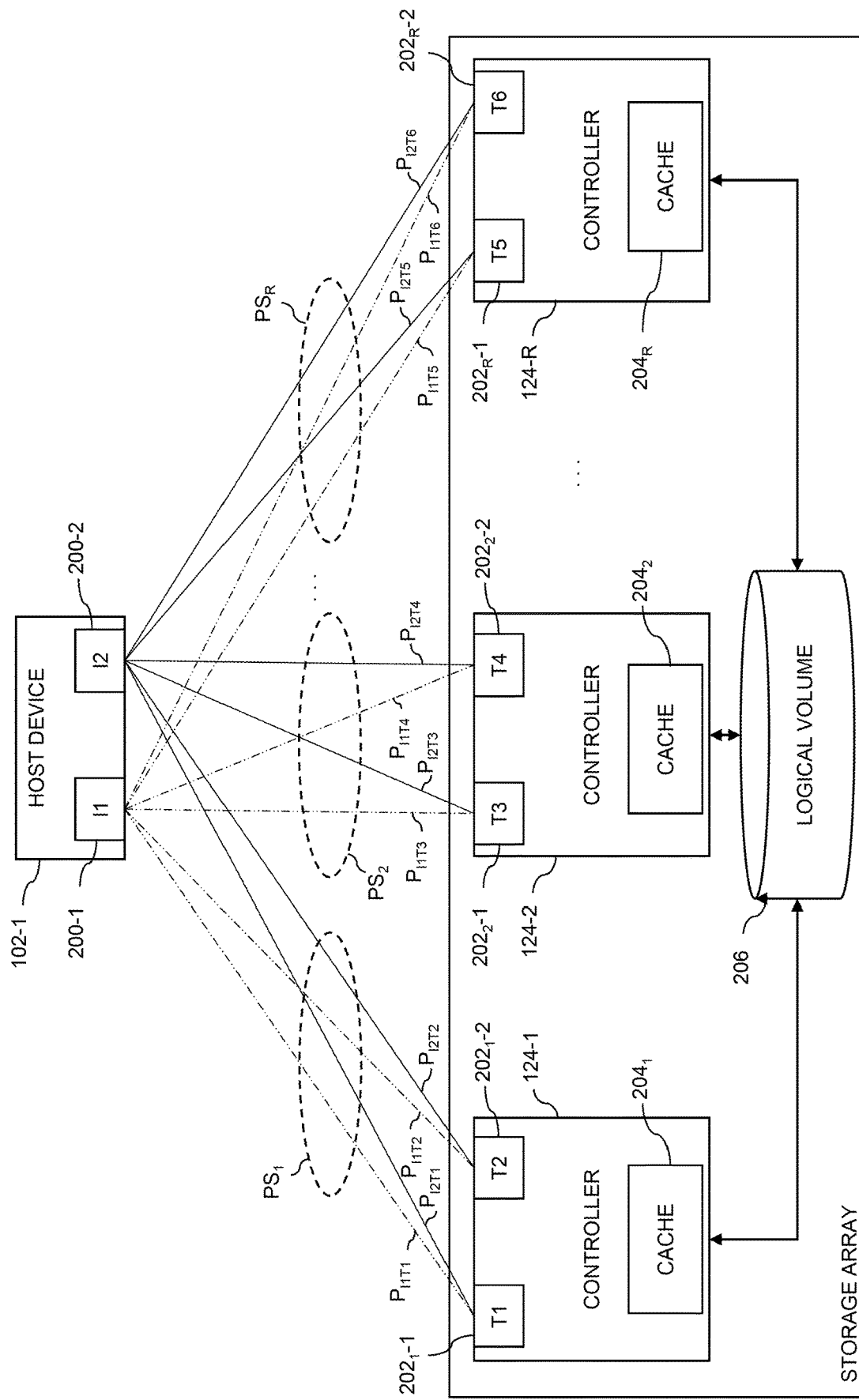
FIG. 2 is a block diagram illustrating paths between a host device and controllers of the information processing system of FIG. 1 in one or more illustrative embodiments.

In the example shown in FIG. 2, controller 124-1 comprises ports $202_1$-1 and $202_1$-2, controller 124-2 comprises ports $202_2$-1 and $202_2$-2, . . . and controller 124-R comprises ports $202_R$-1 and $202_R$-2. In some embodiments, the ports 202 are referred to as targets for the IO paths. For example, in the illustrated example, the ports $202_1$-1 and $202_1$-2 of controller 124-1 may be referred to as targets 1 (T1) and 2 (T2) respectively, the ports $202_2$-1 and $202_2$-2 of controller 124-2 may be referred to as targets 3 (T3) and 4 (T4) respectively, and the ports $202_R$-1 and $202_R$-2 of controller 124-R may be referred to as targets 5 (T5) and 6 (T6) respectively.

The cache $204_1$, $204_2$, $204_3$ of each of the controllers 124 comprise one or more memory devices such as, e.g., random access memory (RAM), read-only memory (ROM), flash memory or other types of memory, in any combination.

In some embodiments, cache 126 is a global cache that is separate from and accessible by all of the controllers 124. Cache 126 may comprise one or more memory devices such as, e.g., RAM, ROM, flash memory or other types of memory, in any combination. In some embodiments, the caches 204 of one or more of the controllers 124 may together comprise some or all of cache 126.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

The host devices 102 comprise respective sets of MPIO drivers 112-1 through 112-N and respective path management logic 114-1 through 114-N. The MPIO drivers 112 collectively comprise a multipath layer of the host devices 102. The path management logic 114 may be implemented as part of the MPIO drivers 112 of the respective host devices 102 or separate from the MPIO drivers 112, as shown in the example of FIG. 1.

MPIO drivers 112 typically group all paths from a host device to a logical volume, such as a LUN, into a single logical device known as a multipath device. The individual block devices representing each path are known as native devices. Applications use a multipath device for IO operations so that the IO operations may be distributed across all available paths. When paths fail or timeout, the MPIO driver will typically redirect the IO operations to other alive paths in the multipath device.

The MPIO drivers 112 described herein may comprise, for example, otherwise conventional MPIO drivers, such as PowerPath® drivers from Dell EMC, suitably modified in the manner disclosed herein to provide functionality for the configuration of block devices. Other types of MPIO drivers from other driver vendors may be suitably modified to incorporate functionality for the configuration of block devices as disclosed herein.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the IO queues is more generally referred to herein as "path selection" and may be controlled using the path management logic 114-1 associated with MPIO driver 112-1. Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers of the multipath layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

With reference again to the example of FIG. 2, host device 102-1 comprises a multipath device that includes a plurality of paths P between the host device 102-1 and a logical volume 206 of the storage array 105. Each path P comprises an initiator and a target. For example, a path $P_{I1T1}$ from host device 102-1 to the logical volume 206 comprises initiator I1 (i.e., HBA port 200-1 of host device 102-1) and target T1 (i.e., port $202_1$-1 of controller 124-1). Paths $P_{I2T1}$, $P_{I1T2}$, $P_{I2T2}$, $P_{I1T3}$, $P_{I2T3}$, $P_{I1T4}$, $P_{I2T4}$, $P_{I1T5}$, $P_{I2T5}$, $P_{I1T6}$ and $P_{I2T6}$ similarly comprise respective initiators and targets as illustrated. The paths P of the multipath device that utilize the same controller 124-1 may also be grouped together as path sets PS. As illustrated in FIG. 2, for example, paths $P_{I1T1}$, $P_{I2T1}$, $P_{I1T2}$ and $P_{I2T2}$ utilize controller 124-1 and are grouped together into a path set $PS_1$; paths $P_{I1T3}$, $P_{I2T3}$, $P_{I1T4}$ and $P_{I2T4}$ utilize controller 124-2 and are grouped together into a path set $PS_2$; and paths $P_{I1T5}$, $P_{I2T5}$, $P_{I1T6}$ and $P_{I2T6}$ utilize controller 124-R and are grouped together into a path set $PS_R$.

In some embodiments, the target ports 202 provide current values for each of a temperature, current, voltage, receive power and transmit power, as discussed further below in conjunction with FIG. 5. In addition, the manufacturer for such HBA ports 200 typically provides upper and lower threshold values for alarm and warning levels of operation.

The MPIO drivers utilize the multiple paths described above to send IO operations from the host devices 102 to the storage array 105.

For example, an MPIO driver 112-1 is configured to select IO operations from its corresponding IO queues for delivery to the storage array 105 over the SAN 104. The sources of the IO operations stored in the IO queues illustratively include respective processes of one or more applications executing on the host device 102-1. Other types of sources of IO operations may be present in a given implementation of system 100.

Figure 3:
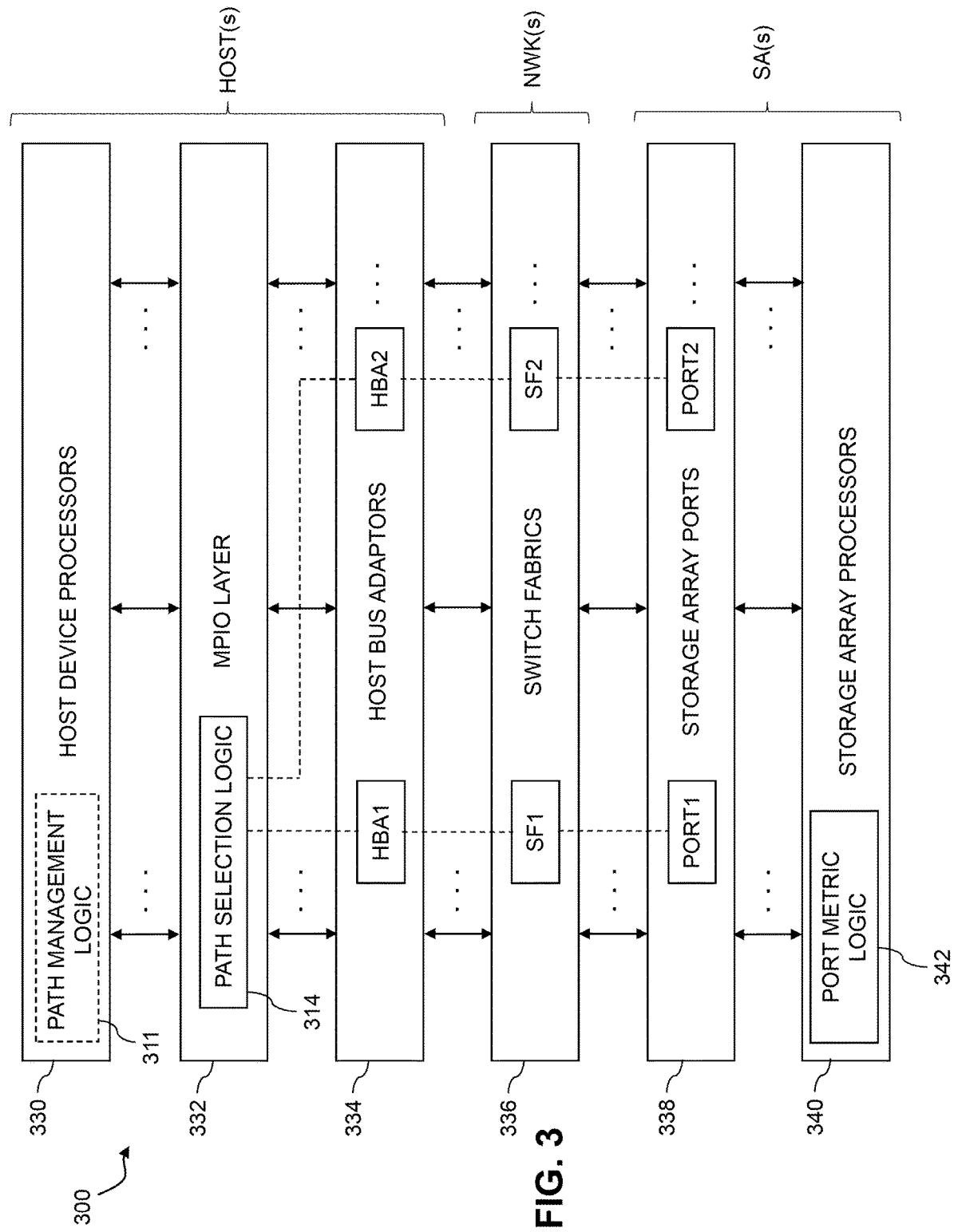
FIG. 3 is a block diagram showing multiple layers of a layered system architecture that includes a multi-path layer with functionality for path management and failure prediction using target port power levels in an illustrative embodiment of the disclosure.

Referring now to FIG. 3, another illustrative embodiment is shown. In this embodiment, an information processing system 300 comprises host-side path management logic 311, path selection logic 314 and storage-side port metric logic 342. There may be separate instances of one or more such elements associated with each of a plurality of system components such as host devices and storage arrays of the system 300.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks ("nwks"), and the storage array port layer 338 and storage array processor layer 340 are associated with one or more storage arrays ("SAs").

The system 300 in this embodiment implements path management and failure prediction using power levels of one or more target port associated with one or more storage arrays utilizing one or more MPIO drivers of the MPIO layer 332, and associated instances of host-side path management logic 311 and path selection logic 314 and storage-side port metric logic 342. The host-side path management logic 311 is illustratively shown as part of one or more host device processors of the host device processor layer 330. The host-side path selection logic 314 is illustratively shown as part of the MPIO layer 332. Similarly, the storage-side port metric logic 342 is illustratively shown as part of one or more storage array processors of the storage array processor layer 340. A wide variety of other distributed logic arrangements are possible, and the host-side path management logic 311 and path selection logic 314 and storage-side port metric logic 342 are therefore shown in dashed outline in the figure. For example, the path management logic 311 may be implemented within the MPIO layer 332 rather than the host device processor layer 330, the path management logic 311 may be implemented at least in part within the host device processor layer 330 and at least in part within the MPIO layer 332, etc. The host-side path management logic 311 and path selection logic 314 and storage-side port metric logic 342 illustratively operate in conjunction with one or more MPIO drivers of the MPIO layer 332 to facilitate path management and failure prediction using target port power levels in the manner disclosed herein.

The MPIO layer 332 is an example of what is also referred to herein as a multi-path layer, and comprises one or more MPIO drivers implemented in respective host devices. Each such MPIO driver illustratively comprises an instance of path selection logic 314 configured to provide functionality similar to that of path management logic 114 described above with respect to MPIO drivers 112. Additional or alternative layers and logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

It is assumed in this embodiment that the host devices through their respective MPIO drivers and respective instances of path selection logic 314 provide functionality for automated connectivity provisioning. Accordingly, the path selection logic 314 in some embodiments automatically establishes connectivity to one or more logical storage devices of one or more storage arrays, and determines appropriate paths over which to send particular IO operations to those logical storage devices of the one or more storage arrays.

The host-side path management logic 311 and the storage-side port metric logic 342 are configured to provide functionality for path management and failure prediction using target port power levels as described elsewhere herein.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

One or more aspects of the disclosure recognize that some path failures can be predicted in advance. Thus, multipathing software has an opportunity to act proactively to predict the failure, and can avoid IO retry penalties by proactively making necessary changes to paths which may be affected by the potential failure (IO timeout issues can also be avoided for sensitive applications).

In one or more embodiments, a target port that may fail is proactively identified and paths associated with a failing target port are placed in a standby mode. In some embodiments, this proactive detection of a failure and placement of the associated target port in a standby mode provides a graceful movement of paths to the standby mode and thereby avoids an abrupt failure of paths between an initiator and target.

In one exemplary embodiment, the disclosed techniques for path management and failure prediction using target port power levels predict path failures by understanding the health of a target port (e.g., a small form-factor pluggable port) using target port receive and/or transmit power levels.

Figure 4:
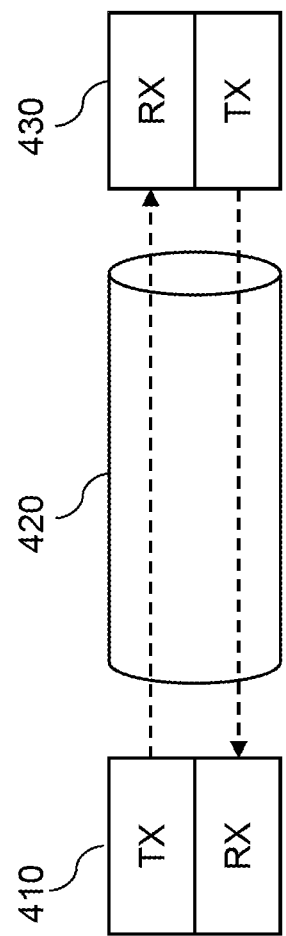
FIG. 4 illustrates an exemplary initiator port and an exemplary target port of FIG. 2, according to one or more embodiments.

FIG. 4 illustrates an exemplary initiator port 410 and an exemplary target port 430 of FIG. 2, connected using a fiber cable 420, according to one or more embodiments. As shown in the example of FIG. 4, the exemplary initiator port 410 comprises two receptacles into which the fiber cable 420 is connected. For example, a first transmit channel (TX) transceiver can be the source (e.g., initiator) of the light signal. Thus, looking at the TX power on this initiator port 410 provides an indication of the light energy created by the source. Similarly, a second receive channel (RX) transceiver can be the recipient (e.g., target) of the light signal. Thus, looking at the RX power on this target port 430 provides an indication of the light energy created by the initiator port 410 as it passes through the fiber cable 420 and reaches the target port 430.

Typically, the signal strength of each port module includes a transmit power (e.g., transmit power signal) and a receive power (e.g., receive power signal).

For any SFP transceiver, the value of the transmit and receive power can be specified to be in a specific range, in which the transceiver can work normally. An acceptable range for transmit and receive power is typically documented clearly by each array vendor. An SFP optical transceiver may be a hot-swappable, compact component that provides fiber connectivity for optical networking, such as on target ports 202. An SFP optical transceiver is an interface module through which connections are made (e.g., the SFP optical transceiver connects to a next node via a cable or another connection). When transmit and/or receive power values enter a warning level, the storage array may log messages indicating the problem. In addition, if the transmit and/or receive power values go beyond a specified alarm level, the storage array may shut down the respective ports.

Figure 5:
FIG. 5 is a sample table illustrating a number of alarm and warning threshold values for a number of characteristics of a target port, according to an embodiment.

FIG. 5 is a sample table 500 illustrating a number of alarm and warning threshold values for a number of characteristics of an exemplary target port, according to an embodiment. In the example of FIG. 5, the sample table 500 indicates the current value, and upper and lower values for alarm and warning threshold values, for each of a temperature, current, voltage, receive power and transmit power. The alarm and warning threshold values typically depend on an implementation and may be specified by the vendor of the corresponding target port, as would be apparent to a person of ordinary skill in the art.

Generally, a warning threshold value indicates a high chance that the SFPs of the target ports 202 may enter a nonfunctional state. Likewise, an alarm threshold value indicates that an SFP of the target ports 202 is not functional, and the storage array 105 will initiate a port shutdown.

Illustrative embodiments of the techniques and functionality of path management logic 114 will now be described in more detail with reference to the example process 600 shown in the flow diagram of FIG. 6.

FIG. 6 is a flow diagram of an example process 600 for path management and failure prediction using target port power levels in some embodiments. As shown in FIG. 6, the exemplary path management and failure prediction process 600 initially obtains, by a first entity (such as an initiator) that communicates over a network with at least one second entity (such as a target) via a plurality of paths, an indication of a transmit power level and/or a receive power level of a target port (e.g., a small form-factor pluggable port) associated with the second entity during step 605. During step 610, the first entity evaluates the transmit power level and/or the receive power level of the target port relative to at least one corresponding threshold (e.g., an upper and/or lower threshold for transmit and/or receive power).

Finally, during step 615, the first entity sets a path state of one or more paths between the first entity and the target port to a standby state based on the evaluating, such that the first entity makes use of only paths between the first entity and other target ports of the second entity that are in an active state. In some embodiments, the standby state may cause the initiator to create no new connections using paths in the standby state, as a preventative measure.

The process 600 as shown in FIG. 6 is suitable for use in the system 100 but is more generally applicable to other types of systems comprising multiple host devices and a shared storage system.

In some embodiments, the exemplary path management and failure prediction process 600 of FIG. 6 allows existing communications on the one or more paths between the first entity and the target port to complete in the standby state. The transmit power level and/or the receive power level of the target port may be monitored during the standby state and the path state of one or more paths between the first entity and the target port can be restored to an active state based on the evaluating.

The at least one corresponding threshold may define a normal operating range of the target port. The at least one corresponding threshold can be: (i) obtained from a provider of the target port, and/or (ii) learned by analyzing historical power level data of the target port. The at least one corresponding threshold comprises one or more thresholds associated with an alarm state and one or more thresholds associated with a warning state.

The target port can provide the transmit power level and/or the receive power level of the target port to the second entity. The second entity optionally interrogates the target port (e.g., using a vendor specific log sense command) to obtain the transmit power level and/or the receive power level.

The evaluating may also evaluate a temperature, a current, and/or a voltage of the target port relative to at least one corresponding threshold.

Separate instances of the FIG. 6 process may be performed in respective additional host devices that share the storage array.

The particular processing operations and other system functionality described in conjunction with the flow diagram of FIG. 6 are presented by way of illustrative example only, and should not be construed as limiting the scope of the disclosure in any way. Alternative embodiments can use other types of processing operations involving host devices, storage systems and logics. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different configuration logic arrangements within a given information processing system.

FIG. 7 illustrates exemplary pseudo code for a path management and failure prediction process 700 using target port power levels, according to one embodiment of the disclosure. As shown in the FIG. 7 example of the path management and failure prediction process 700, the following functions are performed:

1. The storage array 105 monitors the receive and/or transmit power values of the SFP of the target ports 202.

2. When the receive and/or transmit power values of the SFP of a given target port 202 fall below a warning or alarm threshold (or outside of a specified range), as discussed above in conjunction with FIG. 5, the storage array 105 updates the values in a vendor-specific SCSI page.

3. The MPIO driver 112 installed on a given host device 102 monitors the health of the SFPs using, for example, vendor-specific log sense commands.

4. When the obtained receive and/or transmit power values of the SFP of a given target port 202 fall below a warning or alarm threshold (or outside of a specified range), the MPIO driver 112 performs the following steps:

a. place all paths to the affected target SFPs in a standby mode (in this manner, the MPIO driver 112 will not dispatch IOs via target ports that may fail);

b. available and unaffected paths are used for IO activity; and c. log a message in the host device 102, so end users are aware of the fault situation and type of fault that can cause a path failure.

5. The MPIO driver 112 periodically checks if the receive and/or transmit power values of the SFPs of target ports 202 in the standby mode are restored back to a normal range (for example, using an aging period to check port status periodically, using the log sense commands); once the receive and/or transmit power values of the SFPs of target ports 202 in the standby mode are back to a normal range, the MPIO driver 112 changes the path state to an active mode and IOs can again be dispatched (for example, after a successful path test).

Functionality such as that described in conjunction with the flow diagram of FIG. 6 and the pseudo code of FIG. 7 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The storage array 105 may maintain a log of transmit and receive power levels, for example, of target ports 202 (e.g., of the SFP of a respective target port 202) in a vendor-specific page. In this manner, when there is a significant difference in values of any specific transmit and/or receive power levels of a given targets port 202, the MPIO driver 112, for example, can log the physical health of the target port 202 and take necessary action on affected paths.

When the transmit and/or receive power levels are higher than a specified threshold, for example, the SFP can become damaged and the storage array 105 can also have this information updated so that the MPIO driver 112, for example, can log in for the host side and for application/server administrators to take necessary actions on the affected paths.

The above-described functions associated with functionality for path management and failure prediction using target port power levels are carried out at least in part under the control of path management logic 114. For example, path management logic 114 is illustratively configured to control performance of portions of the processes shown in the flow diagram and pseudo code described above in conjunction with FIGS. 6 and 7, respectively.

An apparatus may comprise a host device comprising a processor coupled to memory, the host device being configured to communicate over a network with a storage system via a plurality of paths, the host device being configured to implement the disclosed techniques for path management and failure prediction using target port power levels.

A computer program product may comprise a non-transitory processor-readable storage medium having stored therein program code of one or more software programs, wherein the program code, when executed by at least one processor of a host device, causes the host device to implement the disclosed techniques for path management and failure prediction using target port power levels.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding IO queue for delivery to the storage array 105 over the SAN 104. Accordingly, functionality described above in the context of the first MPIO driver 112-1 is assumed to be similarly performed by each of the other MPIO drivers, such as MPIO driver 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support functionality for the configuration of block devices.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with non-volatile memory express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeOF.

It is to be appreciated that these and other features of illustrative embodiments are presented by way of example only and should not be construed as limiting in any way. Accordingly, different numbers, types and arrangements of system components such as host devices 102, SAN 104, storage array 105, storage devices 106, IO queues, MPIO drivers 112, path management logic 114, controllers 124 and cache 126 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise RAM, ROM, flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the path management logic 114 may be implemented at least in part in software, as indicated previously herein.

One or more embodiments of the disclosure provide improved methods, apparatus and computer program products for path management and failure prediction using target port power levels. The foregoing applications and associated embodiments should be considered as illustrative only, and numerous other embodiments can be configured using the techniques disclosed herein, in a wide variety of different applications.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers and additional or alternative components. Also, the particular configurations of system and device elements and associated processing operations illustratively shown in the drawings can be varied in other embodiments. For example, a wide variety of different MPIO driver configurations and storage array arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method, comprising:
obtaining, by a first entity that communicates over a network with at least one second entity via a plurality of paths, an indication of one or more of a transmit power level and a receive power level of at least one target port associated with the second entity;
evaluating the one or more of the transmit power level and the receive power level of the at least one target port relative to at least one corresponding threshold; and
setting, by the first entity, a path state of one or more paths between the first entity and the at least one target port to a standby state based at least in part on the evaluating, wherein the first entity establishes paths between the first entity and one or more other target ports of the second entity in an active state;
wherein the method is performed by at least one processing device comprising a processor coupled to a memory.

2. The method of claim 1, wherein one or more existing communications on the one or more paths between the first entity and the at least one target port are allowed to complete in the standby state.

3. The method of claim 1, further comprising monitoring the one or more of the transmit power level and the receive power level of the at least one target port during the standby state and restoring the path state of one or more paths between the first entity and the at least one target port to an active state based at least in part on the evaluating.

4. The method of claim 1, wherein the at least one target port comprises a small form-factor pluggable port.

5. The method of claim 1, wherein the at least one corresponding threshold defines a normal operating range of the at least one target port.

6. The method of claim 5, wherein the at least one corresponding threshold is one or more of: (i) obtained from a provider of the target port, and (ii) learned by analyzing historical power level data of the target port.

7. The method of claim 1, wherein the at least one corresponding threshold comprises one or more thresholds associated with an alarm state and one or more thresholds associated with a warning state.

8. The method of claim 1, wherein the at least one target port provides the one or more of the transmit power level and the receive power level of the at least one target port to the second entity.

9. The method of claim 8, wherein the second entity interrogates the at least one target port to obtain the one or more of the transmit power level and the receive power level.

10. The method of claim 1, wherein the first entity is associated with a host device and wherein the second entity is associated with a controller of a storage array.

11. The method of claim 1, wherein the evaluating further comprises evaluating one or more of a temperature, a current, and a voltage of the at least one target port relative to at least one corresponding threshold.

12. An apparatus comprising:
at least one processing device comprising a processor coupled to a memory;
the at least one processing device being configured to implement the following steps:
obtaining, by a first entity that communicates over a network with at least one second entity via a plurality of paths, an indication of one or more of a transmit power level and a receive power level of at least one target port associated with the second entity;
evaluating the one or more of the transmit power level and the receive power level of the at least one target port relative to at least one corresponding threshold; and
setting, by the first entity, a path state of one or more paths between the first entity and the at least one target port to a standby state based at least in part on the evaluating, wherein the first entity establishes paths between the first entity and one or more other target ports of the second entity in an active state.

13. The apparatus of claim 12, wherein one or more existing communications on the one or more paths between the first entity and the at least one target port are allowed to complete in the standby state.

14. The apparatus of claim 12, wherein the at least one corresponding threshold defines a normal operating range of the at least one target port, and wherein the at least one corresponding threshold is one or more of: (i) obtained from a provider of the target port, and (ii) learned by analyzing historical power level data of the target port.

15. The apparatus of claim 12, wherein the second entity interrogates the at least one target port to obtain the one or more of the transmit power level and the receive power level.

16. The apparatus of claim 12, wherein the evaluating further comprises evaluating one or more of a temperature, a current, and a voltage of the at least one target port relative to at least one corresponding threshold.

17. A non-transitory processor-readable storage medium having stored therein program code of one or more software programs, wherein the program code when executed by at least one processing device causes the at least one processing device to perform the following steps:
obtaining, by a first entity that communicates over a network with at least one second entity via a plurality of paths, an indication of one or more of a transmit power level and a receive power level of at least one target port associated with the second entity;
evaluating the one or more of the transmit power level and the receive power level of the at least one target port relative to at least one corresponding threshold; and
setting, by the first entity, a path state of one or more paths between the first entity and the at least one target port to a standby state based at least in part on the evaluating, wherein the first entity establishes paths between the first entity and one or more other target ports of the second entity in an active state.

18. The non-transitory processor-readable storage medium of claim 17, wherein one or more existing communications on the one or more paths between the first entity and the at least one target port are allowed to complete in the standby state.

19. The non-transitory processor-readable storage medium of claim 17, wherein the at least one corresponding threshold defines a normal operating range of the at least one target port, and wherein the at least one corresponding threshold is one or more of: (i) obtained from a provider of the target port, and (ii) learned by analyzing historical power level data of the target port.

20. The non-transitory processor-readable storage medium of claim 17, wherein the evaluating further comprises evaluating one or more of a temperature, a current, and a voltage of the at least one target port relative to at least one corresponding threshold.

* * * * *